Dec. 9, 1952 R. J. KOUPAL 2,620,927
TRAY FILTER
Filed Feb. 24, 1950 3 Sheets-Sheet 1

INVENTOR.
Robert J. Koupal,
BY J. Gunz
Agent

Dec. 9, 1952  R. J. KOUPAL  2,620,927
TRAY FILTER
Filed Feb. 24, 1950  3 Sheets-Sheet 2

INVENTOR.
Robert J. Koupal
BY J. Gung
Agent

Dec. 9, 1952  R. J. KOUPAL  2,620,927
TRAY FILTER
Filed Feb. 24, 1950  3 Sheets-Sheet 3
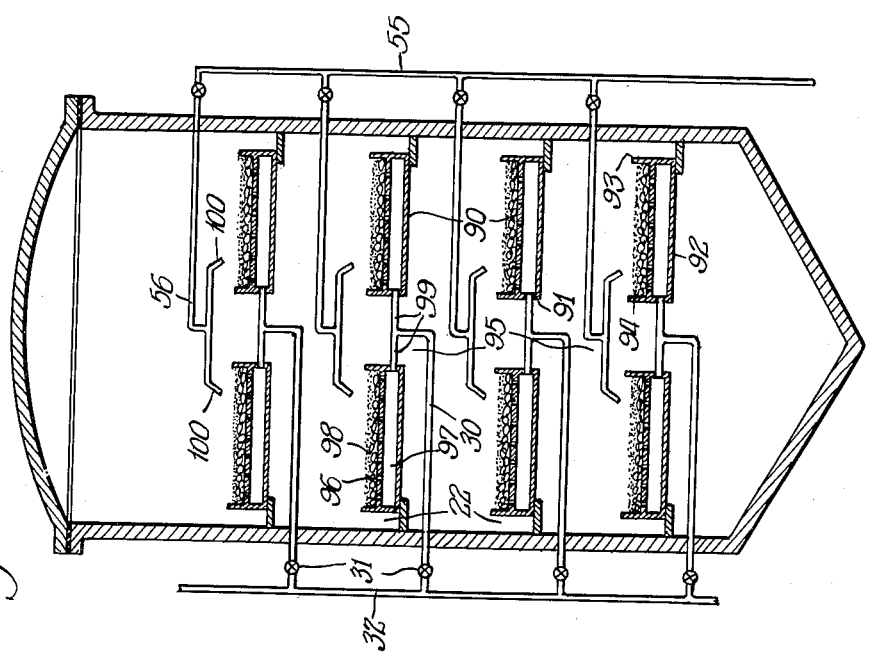
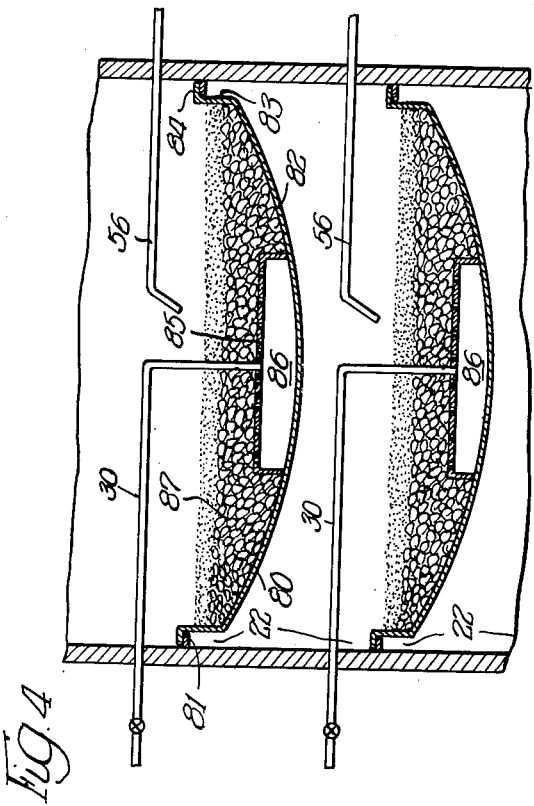
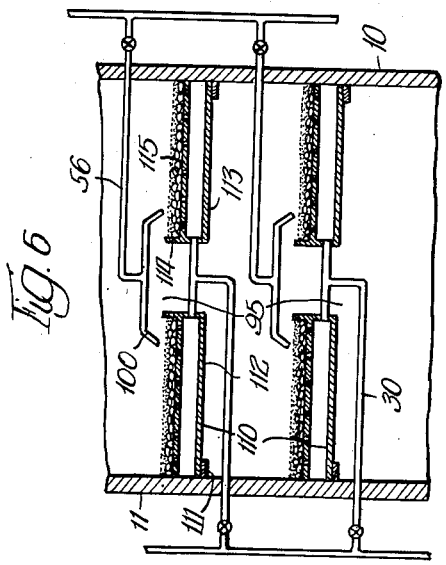
INVENTOR.
Robert J. Koupal,
BY
Agent.

Patented Dec. 9, 1952

2,620,927

UNITED STATES PATENT OFFICE 2,620,927

TRAY FILTER

Robert J. Koupal, Chicago, Ill., assignor to Infilco Incorporated, Chicago, Ill., a corporation of Delaware Application February 24, 1950, Serial No. 146,060

13 Claims. (Cl. 210—134)

This invention relates to sand filters and more particularly to those of the tray design type.

The term "sand" is used herein to designate any filter bed material of discrete particles, such as sand, quartz, granular carbon, magnesite and the like.

It is an object of this invention to provide a filter having a plurality of superposed filter beds of discrete filter material.

Another object is to provide an improved tray filter, which is simple and economical in construction and operation.

Another object is to provide a tray filter wherein each filter bed can be backwashed independently, or, if desired, all beds can be washed collectively.

Another object is to provide a tray filter wherein sand which may be washed off the trays during backwashing is returned thereto by hydraulic means.

Another object is to provide a tray filter equipped with means for hydraulically classifying the material washed from the filter beds during backwashing so that dirt and contaminated filter aid material may be discarded and clean sand returned to the trays.

Another object is a tray filter wherein the filter beds can be replenished or renewed without dismantling the filter.

Other objects of the invention will become apparent from a consideration of the description and claims which follow.

Since the early development of sand filters it has been suggested to reduce the space required to filter a given quantity of water by using superposed filter beds. In spite of the obvious advantage of space saving, such tray filters have not been in extensive use. This was due partly to the fact that the structures proposed were complicated and, therefore, expensive, and partly due to difficulties in operation. One common drawback of previously known tray filters is the fact that such filters had to be dismantled when it was necessary to replenish or renew the sand beds on the trays. In backwashing a sand filter some of the sand may get carried away with the wash water and must be replaced to maintain the proper depth of the filter bed. It is also usual to remove the entire sand from the filter from time to time and wash or replace the sand. This is a relatively simple procedure in a single bed filter, but in prior art tray filters access to the lower trays was only possible by dismantling the filter.

My improved tray filter is simple in construction and operation. It provides uniform liquid distribution over all filter beds without using complicated distribution means; it permits backwashing each filter bed individually, which is important where sufficient water is not available to apply the high wash rate to several beds simultaneously. Washed off sand can be returned and the entire sand beds can be removed from the trays, washed and redeposited, or new sand introduced, without dismantling the filter.

In my improved apparatus the liquid to be filtered enters the filter tank below the lowermost filter and flows upwardly through a continuous passageway, which extends from below the lowermost to above the uppermost filter. The passageway may be peripherally or centrally located or there may be provided both a peripheral and a central passageway. The upflow passageway is in unrestricted communication with the spaces between the filters over practically the entire depth of these spaces. Since the resistance through all filter beds is identical the flow divides equally among the several filters. Filtered water is withdrawn separately from the underdrain compartment of each tray.

One of the novel features of my filter is the hydraulic classification of dirt and sand which are washed off the filter beds and the hydraulic redistribution of clean sand over the several filter beds.

The sand beds of my filter are preferably quite shallow. For best results it is, therefore, preferred to deposit a layer of filter aid material on the sand bed, or to dose the water with a coagulant prior to filtration, as is well known in the art.

The invention will be more fully understood by reference to the detailed description which follows and to the drawings wherein like reference characters designate similar elements and wherein:

Figure 1 is a section, on an enlarged scale, along line 2—2 of Figure 1, with the filter bed removed;

Figure 3 is a vertical cross-sectional view of an embodiment similar to that of Figure 1 but utilizing modified hydraulic means for redistribution of filter sand;

Figure 4 is a vertical cross-sectional view of a modified tray which can be used in a filter according to Figure 1 or 2;

Figure 5 is a vertical cross-sectional view of another embodiment of the invention with the sand ejecting apparatus and inlet piping removed; and Figure 6 is a partial vertical cross-sectional view of still another embodiment of the invention.

Figure 1:
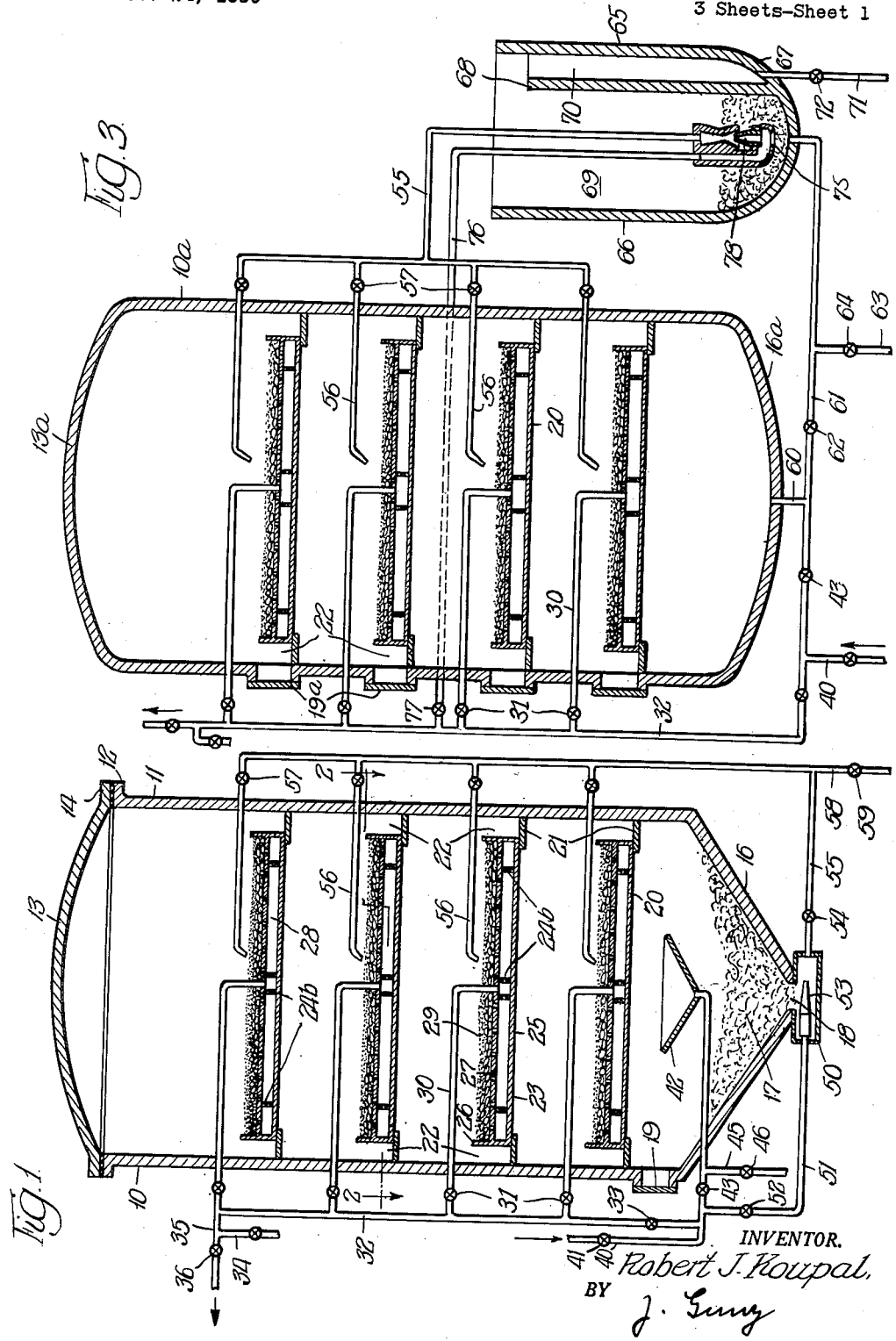
Figure 1 is a vertical cross-sectional view of an embodiment of the invention.
Figure 2:
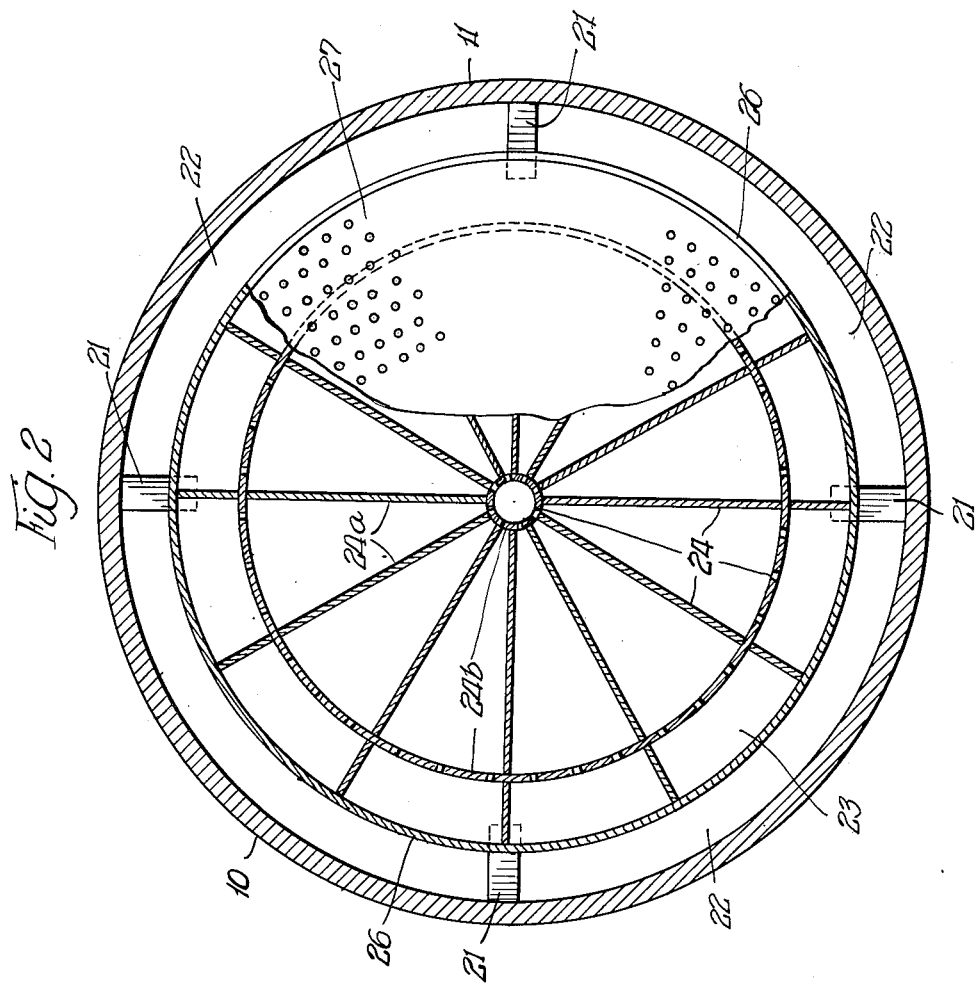

The apparatus of Figures 1 and 2 comprises a cylindrical tank 10 which may be of any suitable material, such as steel. The tank may be built of sections as is well known in the art, or it may have a continuous vertical side wall 11, as shown, provided at its upper end with a flange 12. The tank 10 has a removable top 13 provided with a flange 14. The flanges 12 and 14 may be fastened together by any suitable means, not shown, to provide a liquid-tight seal between the tank and the cover. The bottom 16 of the tank slopes to the center of the tank and forms a sand trap 17. The apex of the hopper bottom 16 is cut away to form an opening 18. A man-hole 19 is provided in the wall 11.

A plurality of superposed filters 20 are axially supported in the tank 10 by any suitable means, such as brackets 21. While four filters are shown for purposes of illustration, it will be obvious that more or less trays can be used and that the number will depend largely on the height of the tank. As shown, the filters are spaced from the tank wall 11 to leave a continuous peripheral annular passageway 22 between the wall 11 and the periphery of the filters 20.

Each filter 20 comprises a tray 23 having a circular imperforate bottom 25 and an upstanding boundary side wall 26. A perforated plate 27 extends across the tray and is spaced a short distance above the bottom 25 to provide an underdrain chamber 28. A supporting and water distributing grid 24 is provided in the underdrain chamber 28. As shown in Figure 2, the grid 24 may comprise a plurality of radial ribs 24a which support the plate 27 and the weight carried by it; annular perforated members 24b aid in distribution of the wash water and prevent surges to the periphery of the filter. Each perforated plate supports a relatively shallow filter bed 29 comprising a lower layer of gravel and an upper layer of fine filter sand. Individual pipes 30 provided with valves 31 connect the underdrain chambers 28 to a common header 32, as shown. The header 32 is connected to a filtered water conduit 35 provided with a filtered water valve 36 and leading to some point of use.

A valved conduit 34 leads from the filtered water conduit upstream of the valve 36 to waste. When the filter is used in a recirculation system such as, for instance, the filter system of a swimming pool, wherein a pump forces water into the filter, the filtered water conduit 35 may be connected directly, or through conduit 34, to the suction side of such a pump.

The header 32 is also connected to a raw water inlet conduit 40. A shut-off valve 4 is provided on the inlet conduit 40 upstream of the connection to the header 32 and a wash water valve 33 is provided on the header 32 downstream of this connection. The raw water inlet conduit leads into the filter and discharges into an open funnel 42 which is spaced above the hopper bottom 16 of the tank and below the lowermost tray 23.

The inlet conduit 40 is also provided with a filter inlet valve 43 downstream of the connection to the header 32 and upstream of the filter. A drain 45 provided with a drain valve 46 leads from the inlet conduit 40, as shown.

A sand ejector 50 is mounted below the opening 18. The inlet end of the ejector is connected to the inlet conduit 40 by a conduit 51 provided with an ejector inlet valve 52. The nozzle 53 of the ejector discharges into a return conduit 55 which may be provided with a valve 54. Distribution conduits 56 provided with valves 57 lead from the return conduit 55 into the filter and discharge over the several filter beds 29. A drain 58 provided with a valve 59 leads from the return conduit 55.

The operation of the apparatus will be readily understood. During filtering the shutoff valve 41, filter inlet valve 43, the several valves 31 and the filtered water valve 36 are open and all other valves closed. Liquid to be filtered arriving through inlet conduit 40 flows laterally from the funnel 42 to the peripheral passageway 22 and upwardly therethrough and into the spaces between and over the several filters 20. Since the resistance to flow through the filter beds is substantially identical for all beds, the flow divides equally and equal portions of liquid are withdrawn from the underdrain chambers 28 through the pipes 30 and discharged into the header 32 from where the liquid passes into the filtered water conduit 35.

At the beginning of a filter run a suitable filter aid material, such as diatomaceous earth or the like, may be added to the water entering the filter until a coat of such material has been formed on the sand beds 29. If desired, small quantities of filter aid can be added continuously during filtering. The use of such filter aids in conjunction with the shallow sand beds is desirable and will result in a clearer effluent and longer filter runs. Until a filter aid coat of sufficient thickness has been formed on the beds the filtered water may not be entirely clear and in such case it will be advisable to filter to waste through conduit 34 or to recirculate the filtered water to the suction inlet of a pump until clear water issues from the filter beds. Such procedures in forming a coat of filter aid material are well known in the art and do not form a part of this invention.

When the filter beds need cleaning the filter inlet valve 43, the filtered water valve 36 and all valves 31 except that on the uppermost pipe 30 are closed and the wash water inlet valve 33 and the drain valve 46 are opened, the other valves remaining in the same position as during filtering. Liquid from conduit 40 flows then through header 32 and the uppermost pipe 30 to the underdrain chamber 28 of the uppermost filter 20 and upwardly through its bed 29, the perforated plate 27 providing uniform distribution of the wash water over the entire cross-sectional area of the filter bed. The wash water overflows the side wall 26 of the tray 23 and passes down through the peripheral passageway 22 and out through the funnel 42, conduit 40 and drain 45. When the uppermost filter has been washed, its valve 31 is closed and the valve 31 of the subjacent filter opened, and that filter washed in the same manner as the first filter. This procedure is repeated with successive filters until all have been washed. Then filtering is resumed in the manner described.

Where sufficient water is available to wash all beds simultaneously, this can be done by opening all valves 31 at the same time.

In washing the filter beds some of the sand may be washed off the trays together with the surface layer of filter aid material and dirt. The sand will settle to, and accumulate in, the hopper bottom 16 while the lighter dirt and filter aid material will be carried away with the wash water through the funnel 42. Before filtering is resumed, the sand accumulated in the sand trap 17 in the bottom 16 may be returned to the filters 20 by operation of the sand ejector 50. During operation of the ejector 50, shut off valve 41, ejector inlet valve 52, valve 54 and the several valves 57 on the distribution pipes 56 are opened and all other valves closed. Liquid from inlet conduit 40 then passes through conduit 51 into the ejector 50. Due to the suction created by the stream of liquid issuing from the ejector nozzle 53 sand is drawn from the sand trap 17 through the opening 18 into the liquid stream and is carried by the liquid through return conduit 55 and the branch pipes 56 into the filter and distributed over the filter beds 29.

In another mode of operation the filters are sanded during the end portion of a backwash period. Operation of the ejector during backwashing has the advantage that the sand is discharged on an expanded filter bed and levels off immediately. Depending on the quantity of water available the several filters will be washed and sanded individually or jointly.

The ejector need not be operated after or with each backwashing unless excessive wash rates are used. Usually it will be sufficient to operate the ejector after several washings when a substantial amount of sand has accumulated in the sand trap 17 in the filter bottom 16.

The sand in trap 17 can be washed thoroughly before it is redistributed on the beds. In this case, the ejector 50 is operated with the valve 54 closed and the drain valve 46 open. Water entering the ejector 50 through conduit 51 will then be forced through the opening 18 into the sand trap 17 and will scour and wash the sand settled in the trap. Dirt and filter aid material washed from the sand will be carried away with the water escaping through funnel 42 and drain 45.

When it is desired to renew the sand of the filter beds the sand may be washed from the trays 20 by using an excessive backwash rate. When all the sand has been washed from the trays and accumulated in the trap 17, the sand is removed by operation of the ejector 50. However, during this procedure the valves 57 remain closed and the valve 59 on drain 58 is opened so that the sand is washed out the drain 58. Thereafter, drain valve 59 is closed and valves 57 are opened. Fresh sand is introduced into the filter through the man-hole 19 and after it has settled into the trap 17 the ejector 50 is operated and the fresh sand distributed on the filters 20 as described above.

The apparatus of Figure 3 is quite similar to that of Figure 1. However, in this preferred embodiment of the invention, which is particularly suitable for large filters, a separate sand trap is used.

In Figure 3 the top 13a of the tank 10a is shown not removable and in larger tanks this is preferable to the more expensive construction of Figure 1. However, it will be understood that a separate cover could be provided in Figure 3 and that the tank of Figure 1 could be like that shown in Figure 3. Access to the interior of the tank is provided in the embodiment of Figure 3 by manholes 19a. The tank 10a has a rounded bottom 16a. The construction of the filters 20, the filtered water outlet system and the wash water inlet system is the same as described in connection with Figure 1. The inlet conduit 40 discharges into the tank through a pipe 60 which extends upwardly through the bottom 16a, the funnel 42 being omitted in this embodiment. Wash water leaves the tank through pipe 60 and a wash water outlet conduit 61 provided with a wash water outlet valve 62. The wash water outlet conduit 61 is connected to the inlet chamber of a sand trap 65. The sand trap 65 is an open top vessel having a side wall 66 and a bottom 67. A partition 68 extends across the vessel from the bottom to an elevation below the top of the wall 66 and separates a larger inlet chamber 69 from a smaller outlet chamber 70, the top of the partition forming an overflow from the inlet chamber to the outlet chamber. A drain 71 provided with a valve 72 leads from the outlet chamber 70. A drain 63 leads from the wash water conduit 61 and is provided with a valve 64.

In the inlet chamber 69 an ejector 75 is provided. The ejector 75 receives raw water through a conduit 76 provided with an ejector inlet valve 77. The conduit 76 may be connected to any suitable part of the pipe system, such as the inlet conduit 40 at a point upstream of the filter inlet valve 43 or, as shown for exemplification, to the header 32. The ejector nozzle 78 discharges into a return conduit 55 from which distribution pipes 56, provided with valves 57, lead into the tank 10a and discharge over the several filters 20, as in Figure 1.

The operation of this embodiment during filtering is the same as described in connection with Figure 1. When backwashing the filter of Figure 3 the wash water carrying dirt and sand is withdrawn through pipe 60 and wash water outlet conduit 61 to the inlet chamber 69 of the sand trap 65. Due to the high backwash velocity considerable turbulence is set up in the chamber 69 which provides effective churning and washing of the sand, whereby the sand is freed of dirt. The size of the trap 65 and the height of the partition 68 are designed so that sand particles will not be carried over the partition 68 at the predetermined backwash rate, but that the lighter dirt and filter aid material are carried over with the outflowing wash water into the outlet chamber 70 and out through drain 71. After backwashing is completed or during the later part of the backwashing operation the ejector inlet valve 77 and one or more valves 57 are opened and the ejector 75 is operated until the sand in the trap 65 has been returned to the filters 20 in the manner described in connection with Figure 1. The ejector need not be operated after each backwashing operation but only when a considerable quantity of sand has accumulated in the trap 65.

When it is desired to renew the filter beds by a charge of fresh sand the entire old sand of the beds can be washed off by using an excessive wash rate. During this procedure the drain valve 64 will be kept open so that the old sand will be carried away with the wash water through drain 63. When all the old sand has been discarded in this manner, drain valve 64 is closed, new sand is placed into trap 65, and ejector 75 is operated to distribute it over the filters.

The trays shown in Figure 4 can be used in the apparatus of Figure 1 as well as in that of Figure 3, but are more suitable for small filters. These trays have the advantage that standard pieces of steel, so called tank heads, can be used. The dished trays 80 can be supported in the same manner as the trays 23 of Figures 1 and 3, as on brackets 81 in spaced relationship to the tank wall 11 to leave a peripheral passageway 22. Each tray 80 comprises a rounded bottom portion 82 and a peripheral wall 83 provided with brackets 84 which rest on the supporting brackets 81.

A perforated partition 85 forms a housing over the central portion of the bottom 82, the space within the housing serving as underdrain chamber 86. The filter beds 87 are supported partly by the dished bottom and partly by the partition 85 which is embedded in the filter beds 87. Pipes 30 are connected to the chambers 86 for withdrawing filtered water and admitting wash water, respectively, as described in connection with Figures 1 and 2. Sand distribution pipes 56 discharge over the filter beds 87 as in the embodiment of Figures 1 and 3.

The apparatus shown in Figure 5 works on the same general principle as that of Figures 1 and 3 and the inlet means and the hydraulic classifying and sand distribution means of either figure may be used with this embodiment of the invention and have been omitted in Figure 5. In the filter of Figure 5, as in the embodiments of Figures 1, 3 and 4, the filters 90 are spaced laterally from the tank wall 11 to form a continuous peripheral passageway 22. However, in this embodiment, the trays 91 are annular, have ring shaped bottoms 92 and upstanding walls 93 and 94 on their outer and inner peripheries, respectively. Thus there is formed in the filter in addition to the peripheral passageway 22 a central continuous passageways 95 leading from below the lowermost filter 90 to above the uppermost filter. Both passageways are in unrestricted communication with the spaces between the filters over substantially the entire depth of said spaces.

An annular perforated plate 96 is mounted spaced above the bottom 92 of each tray 91 to provide an underdrain chamber 97, and is supported by a grid, not shown, as in Figures 1 and 2. A filter bed 98 is supported by the plate 96. Two or more pipes 99 may be connected to spaced points of the underdrain chamber 97 and may be joined to a pipe 30, provided with a valve 31, discharging to a header 32 common to all pipes 30 of the filter. The liquid to be filtered may enter the lower portion of tank 10 through a funnel 42 or a pipe 60, such as shown in Figures 1 and 3, rises through the passageways 22 and 94 and overflows the walls 93 and 94. Equal portions of liquid filter through the several filter beds 98 and are withdrawn through pipes 99 and 30 to header 32 as shown. Backwash water enters the underdrain chambers 97 through header 32 and pipes 30 and 99 and is uniformly distributed across the area of the filter beds by the perforated plates 96. The wash water overflows the walls 93 and 94 into the passageways 22 and 95 and is withdrawn in the manner described in connection with Figure 1 or 3. The provision of the two passageways 22 and 95 reduces the horizontal area over which the liquid to be filtered has to be distributed and across which the wash water has to travel and provides very good distribution.

The sand distribution pipes 56 which may be connected through a conduit 55 to a hydraulic classifying and ejecting system, such as shown in Figure 1 or 3, discharge over the filter beds 98 through two or more branch pipes 100.

The filter of Figure 6 is quite similar to the filter of Figure 5. However, in this embodiment of the invention the annular filters 110 extend to the wall 11 of the tank 10. They may be fixed to the wall 11 but preferably they are removably supported as by brackets 111. The filter tray 112 has an annular bottom 113 and an upstanding annular wall 114 around the inner periphery of the bottom 113. This construction provides a continuous central passageway 95 leading from the lower portion of the tank to its upper portion. In this embodiment all the liquid to be filtered rises and all the wash water flows downwardly through the central passageway 95, which is in unrestricted communication with the spaces between the trays. Otherwise the construction of this embodiment is the same as that of Figure 5. The operation of the filter of Figure 6 will be readily understood and need not be described.

It will be seen that I have invented a filtering apparatus which combines simple construction and operation inherent in single bed filters with the space savings characteristic of a tray filter, thus rendering the use of tray filters practical.

I claim:

1. A filtering apparatus comprising a tank, means for introducing water to be filtered into, and for withdrawing wash water from, the lower portion of said tank, a plurality of superposed filters mounted in said tank, the cross-sectional area of said filters being smaller than the cross-sectional area of said tank, a pipe leading from each filter for withdrawal of filtered water during filtering and for introducing wash water during backwashing, a continuous passageway from said lower portion of said tank to an elevation above the uppermost filter, said passageway being in unrestricted communication with the spaces between and over said filters, a sand distribution pipe leading to each such space and discharging over the subjacent filter, a sand trap providing a settling area wherein sand separating from wash water deposits, an ejector in operative association with said sand trap, and a conduit receiving the ejector discharge and connected to said sand distribution pipes.

2. A tray filter comprising a tank, a plurality of superposed filters in said tank, each filter having a filter bed and an underdrain chamber, the cross-sectional area of said filters being smaller than the cross-sectional area of said tank, whereby there is formed a continuous passageway from the lower to the upper portion of the tank, which passageway is in unrestricted communication with the spaces between and above said filters, conduit means extending into the lower portion of said tank for introducing liquid to be filtered and for withdrawing wash water to waste, pipes connected to said underdrain chambers for introducing wash water and for withdrawing filtered water to a point of use, and means for introducing sand into said tank and distributing it over said filters, said means including a hydraulic ejector and distribution pipes connected to the outlet of said ejector and discharging over said filters.

3. The apparatus according to claim 2 wherein said filters are spaced from the wall of said tank and said passageway is peripherally located.

4. Apparatus according to claim 2 wherein said filters are annular and extend to the wall of said tank and said passageway is centrally located.

5. Apparatus according to claim 2 wherein said filters are annular and are spaced from the wall of said tank whereby a peripheral and a central passageway are provided.

6. Apparatus for filtering liquids comprising a closed filter tank, a plurality of trays mounted in said tank in vertical spaced relationship to each other, each tray having a bottom and a boundary wall, a perforated plate across each tray spaced above the bottom of the tray to form an underdrain chamber, a distributing grid in each underdrain chamber, said grid including at least one annular perforated member coaxial with and spaced from the periphery and the center of said tray, a filter bed of discrete particles supported on each perforated plate, the cross-sectional area of said trays being smaller than the cross-sectional area of said tank, a continuous vertical passageway from the lower to the upper portion of the tank, which passageway is in unrestricted communication with the spaces between said trays over substantially the entire depth of said spaces, inlet means for introducing liquid to be treated into the lower part of said tank, means including conduits connected to each of said underdrain chambers and valves on said conduits for withdrawing filtered water simultaneously from said filters and admitting wash water to said filters in sequence, means for draining wash water from said tank, a sand trap providing a settling area wherein sand separating from wash water deposits, ejector means operatively connected with said sand trap and operable to hydraulically eject sand from said trap, and conduit means receiving the discharge of said ejector and discharging it over said filter beds through separate outlets.

7. Apparatus for filtering liquids comprising a closed tank, a conduit extending into the lower portion of said tank, a plurality of filters mounted in the center of said tank above said conduit and vertically spaced from each other, each filter having a filter bed and an underdrain chamber below the bed, the diameter of said filters being smaller than the diameter of said tank, whereby there is formed a continuous passageway between the periphery of said filters and said tank through which liquid to be filtered entering through said conduit rises to the filters and wash water descends from the filters to said conduit, said passageway being in unrestricted communication with the spaces between said filters, a pipe leading from each underdrain chamber to outside said tank, a common header connected to said pipes, one end of said header being connected to said conduit upstream of said tank, and the other end being connected to a point of use, and valves adapted to regulate flow from said conduit into said filter and into said header and from said header to use, and a valve on each of said pipes.

8. The apparatus of claim 7 wherein said filters are annular whereby there is formed a second continuous passageway through the central portions of said filters through which liquid to be filtered entering through said conduit can rise to the filters and wash water can descend from the filters to the conduit, said central passageway being in unrestricted communication with the spaces between said filters.

9. Apparatus for filtering liquids comprising a cylindrical tank having a cover and an inverted conical bottom, said bottom being apertured at the apex of the cone, a conduit extending into the lower portion of said tank above said bottom, a plurality of superposed filters vertically spaced above said conduit, and laterally spaced from said tank to provide a peripheral flow passageway extending from said lower portion to an elevation above the uppermost filter and in unrestricted communication with the spaces above and between said filters, a perforated filter bed support spaced from the filter bottom in each filter to form an underdrain chamber, a filter bed supported on each support, a pipe connected to each underdrain chamber and adapted to introduce wash water and to withdraw filtered water to a point of use, an ejector mounted below the apertured portion of said bottom, a liquid inlet to said ejector, and a plurality of distribution pipes connected to the ejector outlet and discharging over said filter beds.

10. Apparatus for filtering liquids comprising a closed tank, means for introducing liquid into the lower portion of said tank, a wash water withdrawal conduit connected to the lower portion of the tank, a plurality of superposed filters mounted in said tank, the cros-sectional area of said filters being smaller than the cross-sectional area of said tank, a continuous passageway from the lower to the upper part of said tank, which passageway is in unrestricted communication with the spaces over and between said filters, means for withdrawing filtered liquid from each of said filters, wash water inlet means for said filters, a sand trap having an inlet chamber and an outlet chamber and an overflow from said inlet chamber to said outlet chamber, said wash water withdrawal conduit discharging into said inlet chamber, a drain leading from said outlet chamber, an hydraulic ejector having an intake portion in the lower portion of said inlet chamber, and a distribution pipe for each filter, said distribution pipes being connected to the discharge end of said ejector and discharging over said filters.

11. In combination with a tray filter comprising a tank, a plurality of superposed filters in said tank, each filter having a filter bed and an underdrain chamber, conduit means extending into the lower portion of said tank and adapted to deliver liquid to be filtered into, and to withdraw wash water from, said lower portion, and pipes connected to said underdrain chambers and adapted to deliver wash water thereto and to withdraw filtered water therefrom; a settling chamber having a bottom upon which sand separating from the wash water may deposit, an hydraulic ejector having an intake portion in the lower part of said settling chamber, and a distribution pipe for each filter, said distribution pipes receiving the discharge of said ejector and distributing it over said filters.

12. Apparatus for filtering liquids comprising a tank, a plurality of filters mounted in said tank in vertical spaced relationship to each other, each filter having an underdrain chamber, the cross-sectional area of said filters being smaller than the cross-sectional area of said tank, a continuous vertical passageway from the lower portion to the upper portion of said tank, which passageway is in unrestricted communication with the spaces between said filters over substantially the entire depth of said spaces, a conduit extending into the lower part of said tank, inlet means for liquid to be filtered connected to said conduit, a drain connected to said conduit, means for withdrawing filtered water simultaneously from all filters and for admitting wash water to said filters in sequence, said means comprising a header outside said tank and connected to said inlet means, a pipe connecting each of said underdrain chambers to said header, and a valve on each pipe.

13. Apparatus for filtering liquids comprising a closed filter tank, a plurality of trays mounted in said tank in vertical spaced relationship to each other, each tray having a bottom and a boundary wall, a perforated plate across each tray spaced above the bottom of the tray to form an underdrain chamber, a filter bed of discrete particles supported on each perforated plate, the cross-sectional area of said trays being smaller than the cross-sectional area of said tank whereby there is formed a continuous vertical passageway from the lower to the upper portion of the tank, which passageway is in unrestricted communication with the spaces between said trays over substantially the entire depth of said spaces, means, including a conduit, for introducing liquid to be treated into, and for withdrawing wash water from, the lower part of said tank, and means for withdrawing filtered water simultaneously from said filters and admitting wash water to said filters in sequence or simultaneously, said means including a conduit for each filter connected to the respective underdrain chamber and leading to outside said tank, and a valve on each of said conduits.

ROBERT J. KOUPAL.

REFERENCES CITED

The following references are of record in the file of this patent:

UNITED STATES PATENTS

| Number | Name | Date |
|---|---|---|
| 311,257 | Piefke | Jan. 27, 1885 |
| 709,712 | Kostalek | Sept. 23, 1902 |
| 809,099 | Desrumaux | Jan. 2, 1906 |
| 1,007,929 | Deacon et al. | Nov. 7, 1911 |
| 1,246,850 | Best | Nov. 20, 1917 |
| 2,468,838 | Rey | May 3, 1949 |